UNITED STATES PATENT OFFICE.

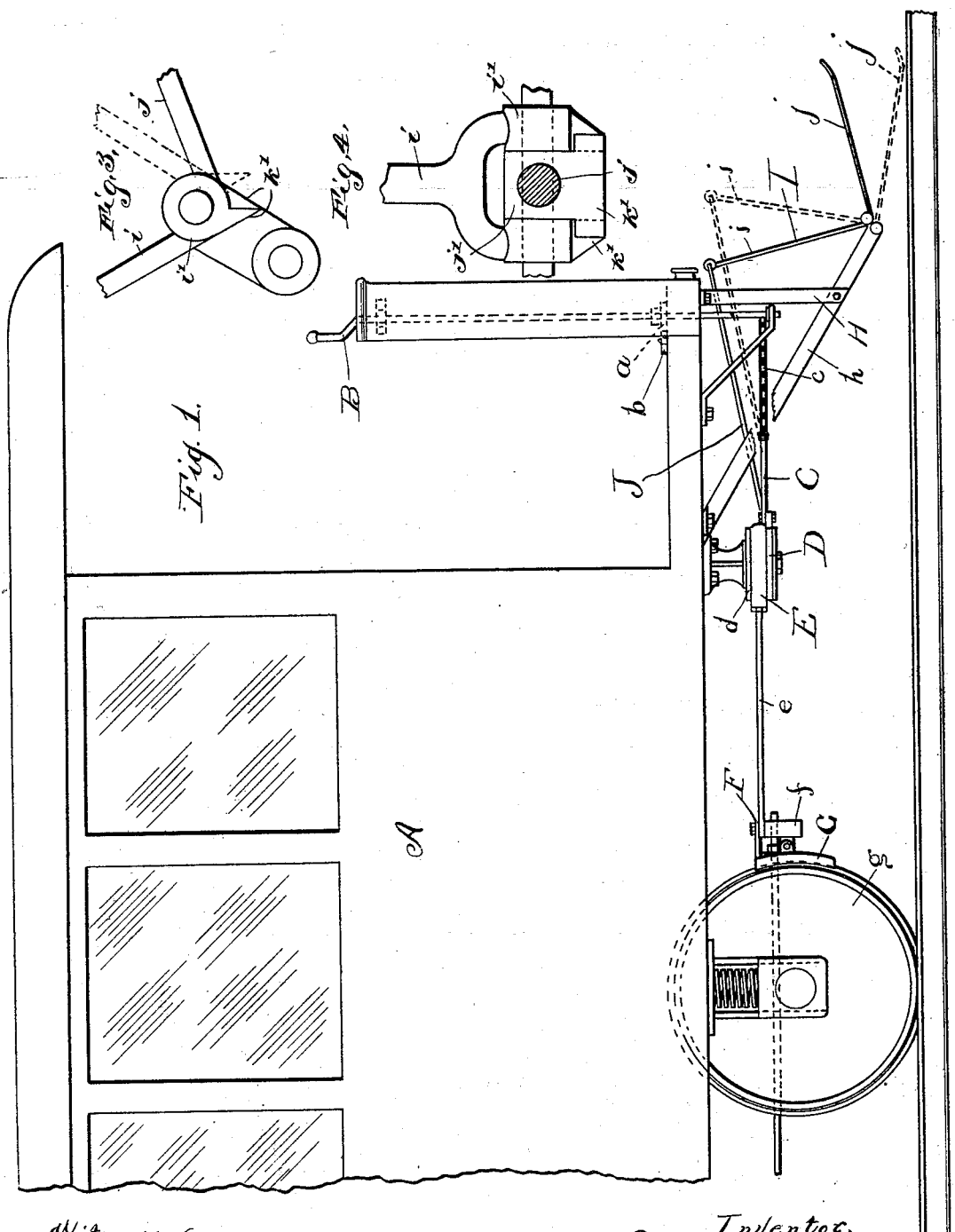

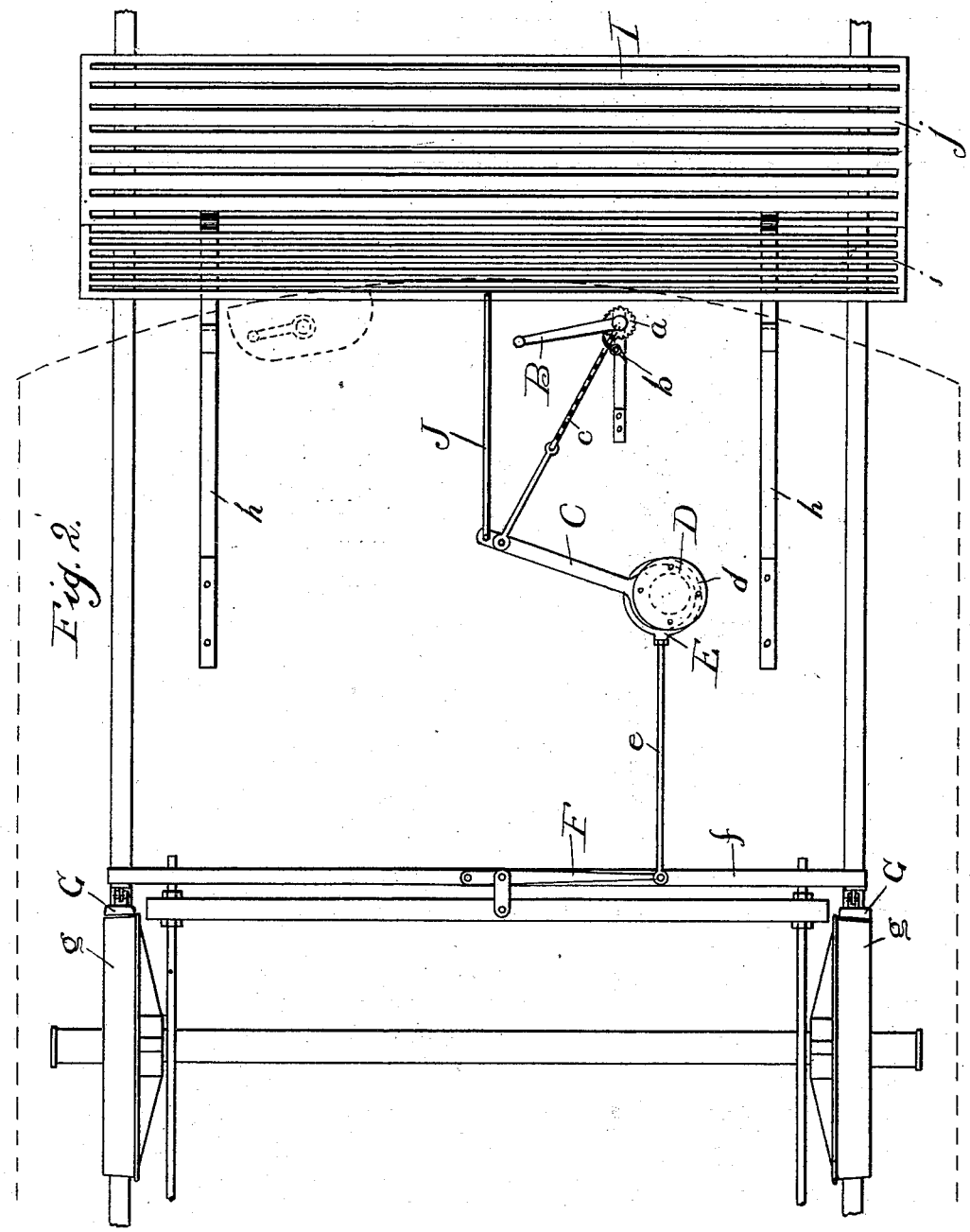

JOHN D. LONG, OF CHICAGO, ILLINOIS.

CAR BRAKE AND FENDER.

SPECIFICATION forming part of Letters Patent No. 647,751, dated April 17, 1900.

Application filed November 6, 1899. Serial No. 735,944. (No model.)

*To all whom it may concern:*

Be it known that I, JOHN D. LONG, a citizen of the United States, residing at Chicago, in the county of Cook and State of Illinois, have invented certain new and useful Improvements in Car Brakes and Fenders; and I do hereby declare the following to be a full, clear, and exact description of the invention, such as will enable others skilled in the art to which it appertains to make and use the same.

My invention relates to a novel construction in a car fender and brake, the object being to provide a fender which is normally sufficiently raised to escape injury by striking obstruction and is so connected with the brake mechanism that when the brakes are put on the fender is thrown in position to scoop up any person happening to be on the track, and, further, to provide a brake mechanism which will enable the brake and fender to be actuated with great rapidity.

In the accompanying drawings, illustrating my invention, Figure 1 is a side elevation of one end of a street-car provided with a fender and brake constructed in accordance with my invention. Fig. 2 is a plan view of same, the platform or floor of the car being indicated in dotted lines. Figs. 3 and 4 are fragmentary detail side and front elevations showing the hinges employed for connecting the leaves of the fender.

Referring now to said drawings, A indicates a car provided at each end with a vertical crank-shaft B for operating the brake and carrying a ratchet-wheel $a$, adapted to be engaged by a pawl $b$ on the platform, operated by the foot of the operator. The lower end of said shaft B projects below the platform and is connected by means of a chain $c$ or other suitable connection with a lever C, forming an integral part of an eccentric D, journaled on a suitable bearing $d$, secured to the bottom of the car. A strap E on said eccentric is connected by means of a rod $e$ with a lever F, pivoted on a brake-beam $f$, carrying brake-shoes G to engage the wheels $g$. Said brake-beam and parts adjacent and connected with same form a part of the brake mechanism generally used and which forms no part of my invention, such mechanism being actuated to force the brake-shoes against the wheels by drawing the free end of the lever F toward the adjacent end of the car.

Extending downwardly from the car-platform on each side and inwardly of the rails are rods H, the lower ends of which are suitably secured to brace-rods $h$, secured at their upper ends to the car-bottom rearwardly from said rods H and extending downwardly at an incline toward the end of the car and projecting beyond the end of same and beyond said rod H. Pivoted upon the free ends of said rods $h$ is a fender I, comprising an L-shaped grating having two leaves $i$ and $j$, pivotally secured together and pivoted at their points of connection with each other to said rods $h$. Said leaf $i$ of said fender I is connected by means of a link J with the end of said lever C, so that the movements of the latter will be transmitted to the fender. Said fender normally stands in the position shown in full lines in Fig. 1—that is, with its leaf $j$ raised from the ground, so that it can readily pass over small obstructions, such as stones, &c., occurring on the track and which frequently break the fender, said pivotal connection between said leaves $i$ and $j$ being such as to limit their relative movement in one direction, the hinges used being of any suitable construction for the purpose. In Figs. 3 and 4 I have illustrated one form of such hinge, the members $i'$ and $j'$ being each provided with a projecting lug $k'$, adapted to engage each other to limit the relative movements of said members $i'$ and $j'$ in one direction; but as soon as the brakes are put on the lever C being drawn forward will move the leaf $i$ of said fender forward also and drop the leaf $j$ of same to the position shown in dotted lines in Fig. 1 sufficiently close to the rails to pick up a person. By means of the pivotal connection between the leaves $i$ and $j$ the latter is enabled to ride over uneven ground between the rails without injury.

In the great majority of cases where persons are injured by cars the motorman or other operator has sufficient time to apply the brakes to partially reduce the speed of the car, and therefore the fender would always be in position to prevent injury to the person and would certainly be brought low enough to prevent the fender from passing over the body, thereby affording greater protection than any fender now used, the latter requiring to be held quite high over the rails to prevent same from being broken by the usual obstructions presented. The height of the end of the fender above the rails is generally from four to eight inches, which obviously permits same to pass over a body lying upon the track. My device has the advantage of being normally out of reach of slight obstructions and being brought into proper position without requiring forethought on the part of the operator, who will invariably instinctively apply his brakes as soon as he realizes that there is danger ahead.

It will be understood that I do not wish to be limited to the particular means for connecting the fender with the brake mechanism herein shown and described, but that any suitable connection with any kind of brake mechanism falls within the scope of my invention.

I claim as my invention—

1. In a car, the combination with the brake mechanism, of a fender comprising two leaves pivotally connected together, and pivoted adjacent their pivotal connection with each other to a rigid part of the car, a lever on the bottom of the car, a rod connecting one of the leaves of said fender with said lever and connection between said lever and said brake mechanism, whereby said fender is held normally raised above the rails when the brakes are released and is lowered to the rails by applying the brakes.

2. In a car, the combination with the brake mechanism, of a fender comprising two leaves pivotally connected together, and pivoted adjacent their pivotal connection with each other to a rigid part of the car, said leaves extending practically at right angles to each other, and connection between one of said leaves and the brake mechanism, whereby the other of said leaves is normally held above the rails when the brakes are released and is dropped upon the rails when the brakes are applied.

3. In a car, the combination with a pivoted fender, of a brake mechanism comprising a beam carrying brake-shoes, a lever for actuating said beam, connection between said lever and an eccentric, an arm on said eccentric, connection between said arm and an operating-lever, and connection between said arm and said fender, whereby the latter is thrown into position to pick up a body or object when the brakes are applied and is held above the rails when the brakes are released.

In testimony whereof I affix my signature in presence of two witnesses.

JNO. D. LONG.

Witnesses:
RUDOLPH WM. LOTZ,
E. F. WILSON.